US009208625B2

(12) United States Patent
Ando et al.

(10) Patent No.: US 9,208,625 B2
(45) **Date of Patent: *Dec. 8, 2015**

(54) MOBILE TERMINAL

(71) Applicant: Renesas Electronics Corporation, Kawasaki-shi, Kanagawa (JP)

(72) Inventors: Eriko Ando, Tokyo (JP); Takashi Kawauchi, Kanagawa (JP); Toru Owada, Kanagawa (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/580,394

(22) Filed: Dec. 23, 2014

(65) Prior Publication Data

US 2015/0112511 A1 Apr. 23, 2015

Related U.S. Application Data

(63) Continuation of application No. 14/103,818, filed on Dec. 11, 2013, now Pat. No. 8,949,017.

(30) Foreign Application Priority Data

Dec. 13, 2012 (JP) ................................ 2012-272177

(51) Int. Cl.
*G05D 1/00* (2006.01)
*G05D 3/00* (2006.01)
(Continued)

(52) U.S. Cl.
CPC ........... *G07C 5/008* (2013.01); *G08G 1/09675* (2013.01); *G08G 1/096775* (2013.01);
(Continued)

(58) Field of Classification Search
CPC ................... G08G 1/09675; G08G 1/096775; G08G 1/096783; G08G 1/166; G08G 1/161; G08G 1/164; G08G 1/096791
USPC ............................................................ 701/1
See application file for complete search history.

(56) References Cited

U.S. PATENT DOCUMENTS

2006/0153189 A1 7/2006 Nitou

FOREIGN PATENT DOCUMENTS

JP 2001-195691 A 7/2001
JP 2006-174179 A 6/2006

(Continued)

OTHER PUBLICATIONS

Illustrated RFID Textbook—All about Wireless IC Tags Directed to Ubiquitous Society, editorial supervisor Junichi Kishigami, first edition, Mar. 4, 2005, pp. 166-181, published by ASCII corporation.

(Continued)

*Primary Examiner* — Maceeh Anwari
(74) *Attorney, Agent, or Firm* — Miles & Stockbridge P.C.

(57) ABSTRACT

If identification information is updated periodically, there is such a problem that when another vehicle is receiving driving support based on transmitted identification information of an own vehicle, if the identification information of the own vehicle is updated, the operation of driving support using the identification information becomes unstable because another vehicle can no longer identify the own vehicle.

A mobile terminal mounted on a vehicle determines whether or not transmission control of identification information is necessary after determining the possibility of identification information misuse, determining the effect by controlling transmission of identification information, and determining the magnitude of adverse influence on the safe driving support service.

5 Claims, 16 Drawing Sheets

(51) Int. Cl.

| | |
|---|---|
| ***G06F 7/00*** | (2006.01) |
| ***G06F 17/00*** | (2006.01) |
| ***G07C 5/00*** | (2006.01) |
| ***G08G 1/0967*** | (2006.01) |
| ***G08G 1/16*** | (2006.01) |

(52) U.S. Cl.

CPC .... *G08G1/096783* (2013.01); *G08G 1/096791* (2013.01); *G08G 1/161* (2013.01); *G08G 1/164* (2013.01); *G08G 1/166* (2013.01)

(56) References Cited

FOREIGN PATENT DOCUMENTS

| | | | |
|---|---|---|---|
| JP | 2009-157466 | A | 7/2009 |
| JP | 2010-204982 | A | 9/2010 |

OTHER PUBLICATIONS

RFC2010-204982 Privacy Extensions for Address Configuration in IPv6 (2001).

*FIG. 3*

2133

301 302 303

| IDENTIFICATION INFORMATION | RECOGNITION START POSITION | LATEST RECOGNITION POSITION |
|---|---|---|
| 11111111 | E140° 45′ N36° 31′ | E140° 55′ N36° 41 |
| 2222222 | E140° 45′ N36° 41′ | E140° 55′ N36° 51 |
| 3333333 | E140° 45′ N36° 31′ | E140° 55′ N36° 35 |
| ... | ... | |

FIG. 4

2134

410 420

| POSITION INFORMATION | DATE/DAY OF WEEK/TIME |
|---|---|
| E140° 45′ N36° 41′ ~ E140° 55′ N36° 51 | EVERY TUESDAY 13:00～15:00 |
| E140° 45′ N36° 51′ ~ E140° 55′ N36° 61′ | WEEKDAY 8:00～9:00 |
| ... | ... |

MOBILE TERMINAL

CROSS-REFERENCE TO RELATED APPLICATION

The disclosure of Japanese Patent Application No. 2012-272177 filed on Dec. 13, 2012 including the specification, drawings and abstract is incorporated herein by reference in its entirety.

BACKGROUND

The present invention relates to a mobile terminal and for example, can be applied to a mobile terminal that transmits information on privacy, such as identification information and status information, between mobile devices.

In recent years, aiming at a reduction in the number of persons killed in traffic accidents, discussion of vehicle-to-vehicle or road-to-vehicle communication for the purpose of safe driving support is in progress. In the safe driving support service, a vehicle, such as an automobile, transmits vehicle information around and also detects a risk of traffic accident, such as collision and rear-end collision, based on vehicle information received from vehicles around and vehicle information of the own vehicle and notifies a user of the risk. Here, the vehicle information refers to a combination of identification information for identifying a mobile device and status information indicating the status of a vehicle, such as position, moving speed, and moving direction.

Because the vehicle information is information on privacy and a device existing in a communicable range with the vehicle can receive the vehicle information, there is a possibility that the vehicle information is misused for the purpose other than the safe driving support. Specifically, in the case where a vehicle tracking a specific vehicle has lost sight of the vehicle at an intersection etc., the vehicle identifies the location of the vehicle being tracked from the received vehicle information and resumes tracking. As described above, if the information to be used for the safe driving support is used easily for a purpose different from the original purpose, it is not possible to obtain trust to the service from users, which prevents the safe driving support service from being spread. Consequently, it is important to prevent vehicle information from being misused. As methods for protecting vehicle information flowing through a communication path, the following techniques are known.

In Japanese Patent Laid-Open No. 2006-174179 (Patent Document 1), as for a vehicle-to-vehicle communication device, another vehicle acquires a vehicle ID for identifying the individual vehicle at the time of vehicle-to-vehicle communication, and thus in order to prevent personal information from being leaked, a period of validity is set to the vehicle ID to be issued and distributed, and each time the period of validity expires, the vehicle ID is updated.

In Japanese Patent Laid-Open No. 2010-204982 (Patent Document 2), the identification information for identifying an own vehicle is updated with a predetermined timing (identification information update function). Then, when the identification information for identifying the own vehicle is updated, if it is determined that the traveling condition of the own vehicle is "proximity condition", the update of the identification information of the own vehicle is prohibited (identification information update function).

In "Illustrated RFID Textbook—All about Wireless IC Tags Directed to Ubiquitous Society—, editorial supervisor Junichi KISHIGAMI, first edition, published by ASCII corporation, Mar. 4, 2005, p. 166-181" (Non-Patent Document 1), identification information is encrypted by using public key cryptography. In the case of the public key cryptography, the side that encrypts information (information transmission side) needs a public key and the side that decodes the information (information reception side) needs a secret key corresponding to the public key. At first, the information reception side holds a public key and a secret key corresponding to the public key and transmits the public key to the information transmission side. The device on the information transmission side generates a random number and then encrypts the identification information by the public key together with the random number. Then, the device sends the encrypted value and random number to the device on the information reception side. The device on the information reception side decodes the encrypted value by using the secret key and the received random number and acquires the identification information.

Further, Non-Patent Document 1 also describes the system for finding a hash function. The device on the information transmission side finds random number (or time information) and a hash value of identification information and sends the random number and the hash value. The information receiving device stores the identification information of the device on the information transmission side in advance. Then, the hash value is obtained from each piece of identification information and the received random number (or time information) and the identification information that agrees with the received hash value is retrieved.

In "RFC2010-204982 Privacy Extensions for Address Configuration in IPv6" (Non-Patent Document 2), the identification information of the device is updated periodically.

SUMMARY

In Patent Document 1 and Non-Patent Document 2, the identification information is updated periodically, and there is such a problem that when another vehicle is receiving driving support based on transmitted vehicle ID of the own vehicle, if the vehicle ID of the own vehicle is updated, the operation of driving support using the vehicle ID becomes unstable because another vehicle can no longer identify the own vehicle. In Patent Document 2, the update of the identification information is prohibited in the "proximate condition", but, if the "proximate condition" is exited, the update of the identification information is performed immediately. Consequently, the driving support provided when not in the proximate condition also has such a problem, as Patent Document 1 and Non-Patent Document 2, that if the vehicle ID of the own vehicle is updated when driving of another vehicle is supported based on the vehicle ID of the own vehicle that is transmitted, it is no longer possible to identify the own vehicle and there is a possibility that the operation of the driving support using the vehicle ID becomes unstable.

The other problems and the new feature will become clear from the description of the present specification and the accompanying drawings.

A mobile terminal according to one embodiment determines whether or not transmission control of mobile device information is necessary after determining the possibility of mobile device information misuse and determining the magnitude of adverse influence on the provided service.

According to the one embodiment described above, it is possible to prevent mobile device information to be used for the provided service from being misused without adversely affecting the provided service.

BRIEF DESCRIPTION OF THE DRAWINGS

FIG. 3 is a diagram illustrating a table for managing surrounding vehicle information of Example 1;

FIG. 4 is a diagram illustrating a table for managing traffic accident dangerous spots of Example 1;

DETAILED DESCRIPTION

Embodiment

Figure 16A:
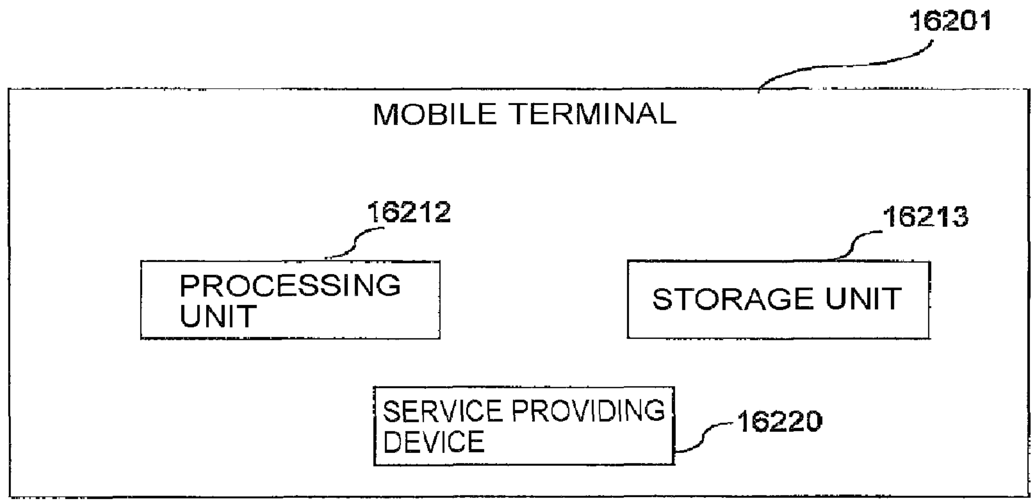
FIG. 16A is a diagram showing a mobile terminal.
Figure 16B:
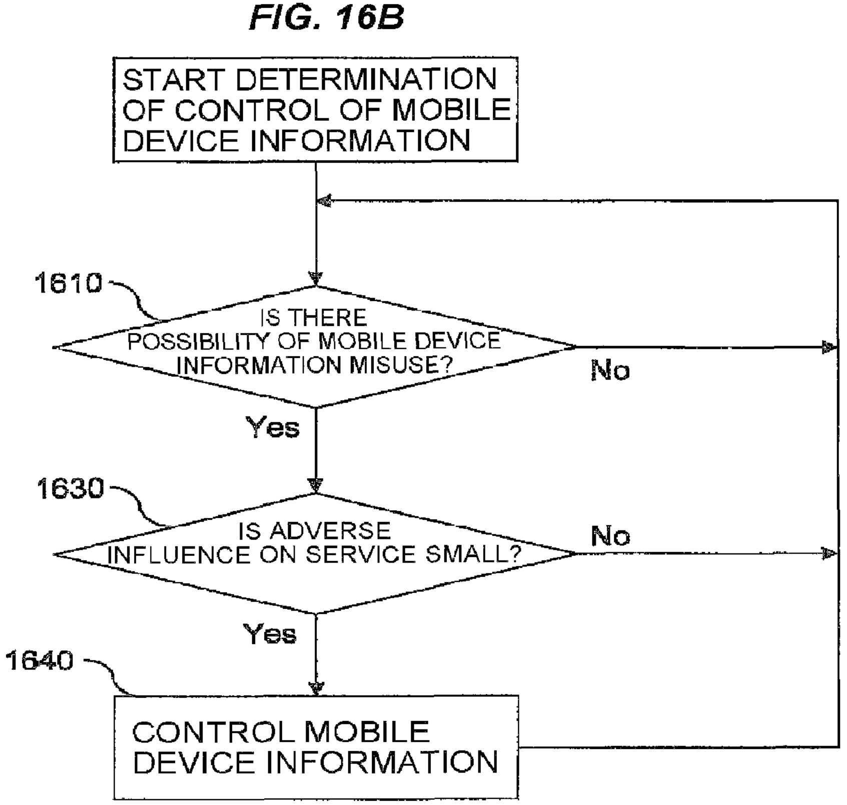
FIG. 16B is a diagram showing a processing flow of transmission control of mobile device information of an embodiment.

FIG. 16A is a diagram showing a mobile terminal, and FIG. 16B is a diagram showing a processing flow of transmission control of mobile device information of an embodiment. As shown in FIG. 16A, a device 16201 has a processing unit 16212 configured to perform transmission control of mobile device information, a storage unit 16213 configured to store mobile device information, and a service providing device 16220. As shown in FIG. 16B, the processing unit 16212 detects a possibility that mobile device information of a mobile device is misused for tracking of an own mobile device at step 1610, and in the case where it is determined that there is a possibility that the mobile device information is misused for tracking of the own mobile device, the procedure proceeds to step 1630. In the other case, after a predetermined time elapses, the possibility that the mobile device information is misused for tracking of the own mobile device is determined again at step 1610. In other words, whether or not transmission control of the mobile device information is necessary is determined. At step 1630, in the case where the mobile device information is controlled, the magnitude of adverse influence on the service provided by the service providing device is determined, and in the case where the adverse influence is small, the procedure proceeds to step 1640. In the case where the adverse influence is large, after a predetermined time elapses, the procedure returns to step 1610 and whether or not the risk that the mobile device information is misused for tracking of the own mobile device lasts is detected. The service provided by the service providing device is the safe driving support service and the traffic information providing service as the driving support service. At step 1640, transmission control of the mobile device information is performed. For example, mobile device information different from the mobile device information currently in use is used. It may also be possible for the mobile device to have a plurality of pieces of mobile device information in advance and to select and use mobile device information different from the current information, or for the mobile device to use new mobile device information by obtaining the new mobile device information from the outside of the mobile device. At step 1640, it may also be possible to perform transmission control of mobile device information by suspending the transmission of mobile device information to the outside instead, not limited to the change of the mobile device information. According to the embodiment, it is possible to prevent mobile device information to be used for the provided service from being misused without adversely affecting the provided service.

Hereinafter, examples are explained in detail with reference to the drawings.

The vehicles in the present examples include "vehicles" defined by Article 2-1 of the Road Traffic Law. Consequently, the vehicles of the present examples include automobiles, motorized bicycles, bicycles, "wheelchairs for physically handicapped persons" that are excluded from vehicles in the Road Traffic Law, etc. Further, the vehicles may be mobile devices, such as ships, aircrafts, and spacecrafts. Furthermore, the vehicles may include persons who carry a portable terminal, such as a mobile phone, smartphone, and tablet terminal.

The following examples will be explained, divided into plural sections or examples, if necessary for convenience. Except for the case where it shows clearly in particular, they are not mutually unrelated and one has relationships such as a modification, application example, detailed explanation, and supplementary explanation of some or entire of another. In the following examples, when referring to the number of elements, etc. (including the number, a numeric value, an amount, a range, etc.), they may be not restricted to the specific number but may be greater or smaller than the specific number, except for the case where they are clearly specified in particular and where they are clearly restricted to a specific number theoretically.

Furthermore, in the following examples, an element (including an operation, a timing chart, an element step, an operation step, etc.) is not necessarily indispensable, except for the case where it is clearly specified in particular and where it is considered to be clearly indispensable from a theoretical point of view, etc. Similarly, in the following examples, when shape, position relationship, etc. of an element etc. is referred to, what resembles or is similar to the shape substantially shall be included, except for the case where it is clearly specified in particular and where it is considered to be clearly not right from a theoretical point of view. This statement also applies to the number etc. (including the number, a numeric value, an amount, a range, etc.) described above.

In all the drawings for explaining examples, the same symbol or related symbol is attached to the region or member having the same function and the repeated explanation thereof is omitted. Further, in the following examples, explanation of the same or similar portion is not repeated, as a principle, except for the case where it is necessary in particular.

Example 1

Figure 1:
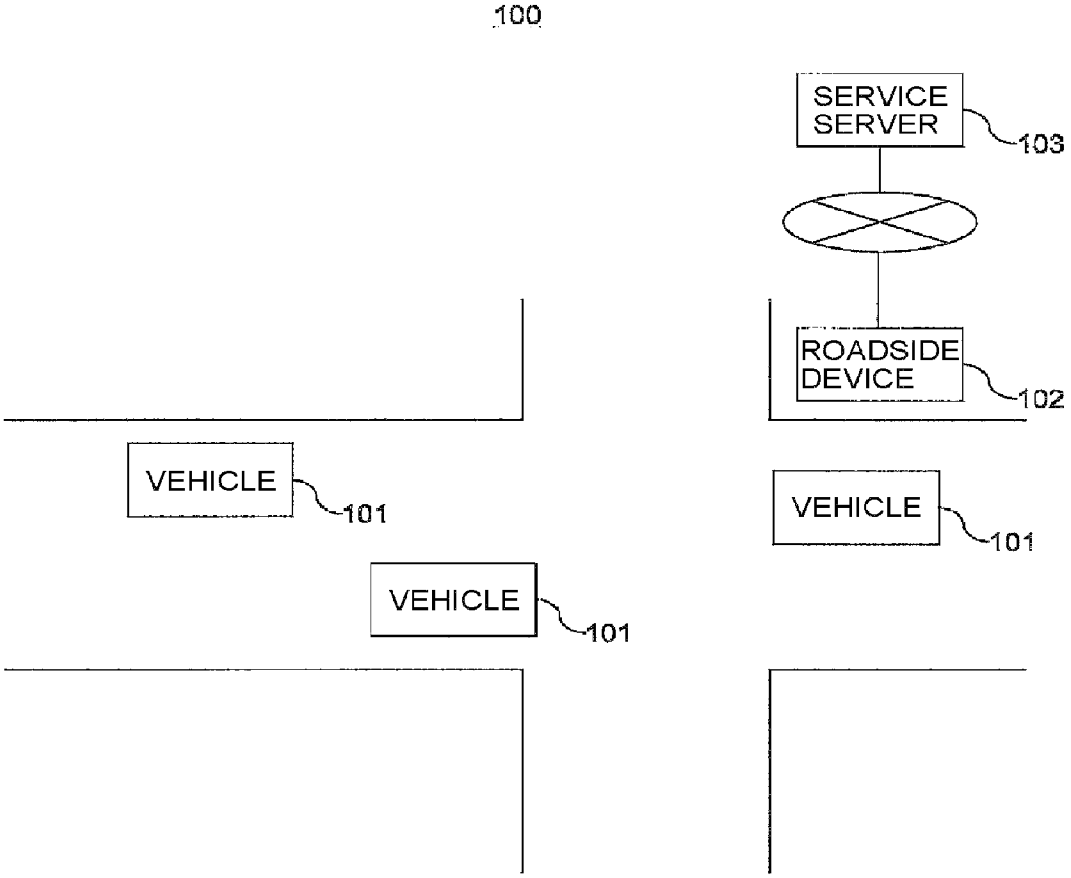
FIG. 1 is a diagram illustrating a configuration of a system of Example 1.

A mobile terminal of an example according to an embodiment is explained below together with the drawings. FIG. 1 is a diagram illustrating a configuration of a vehicle-to-vehicle/road-to-vehicle communication system of Example 1. A vehicle-to-vehicle/road-to-vehicle communication system 100 has vehicles 101, a roadside device 102, and a service server 103. The vehicle 101 performs radio communication with the other vehicle 101 or the roadside device 102. The roadside device 102 performs radio communication with the vehicle 101. Further, the roadside device 102 performs wired or radio communication with the service server 103. The roadside device 102 may be installed outdoors or indoors, or may be installed at a traffic signal or in a device at a gas station. The service server 103 performs wired or radio communication with the roadside device 102 and distributes service information. FIG. 1 shows the way the three vehicles 101 are traveling on the road and the roadside device 102 is installed in the vicinity of a crossroads (intersection). The service server 103 is installed in a position distant from the roadside device 102.

Figure 2:
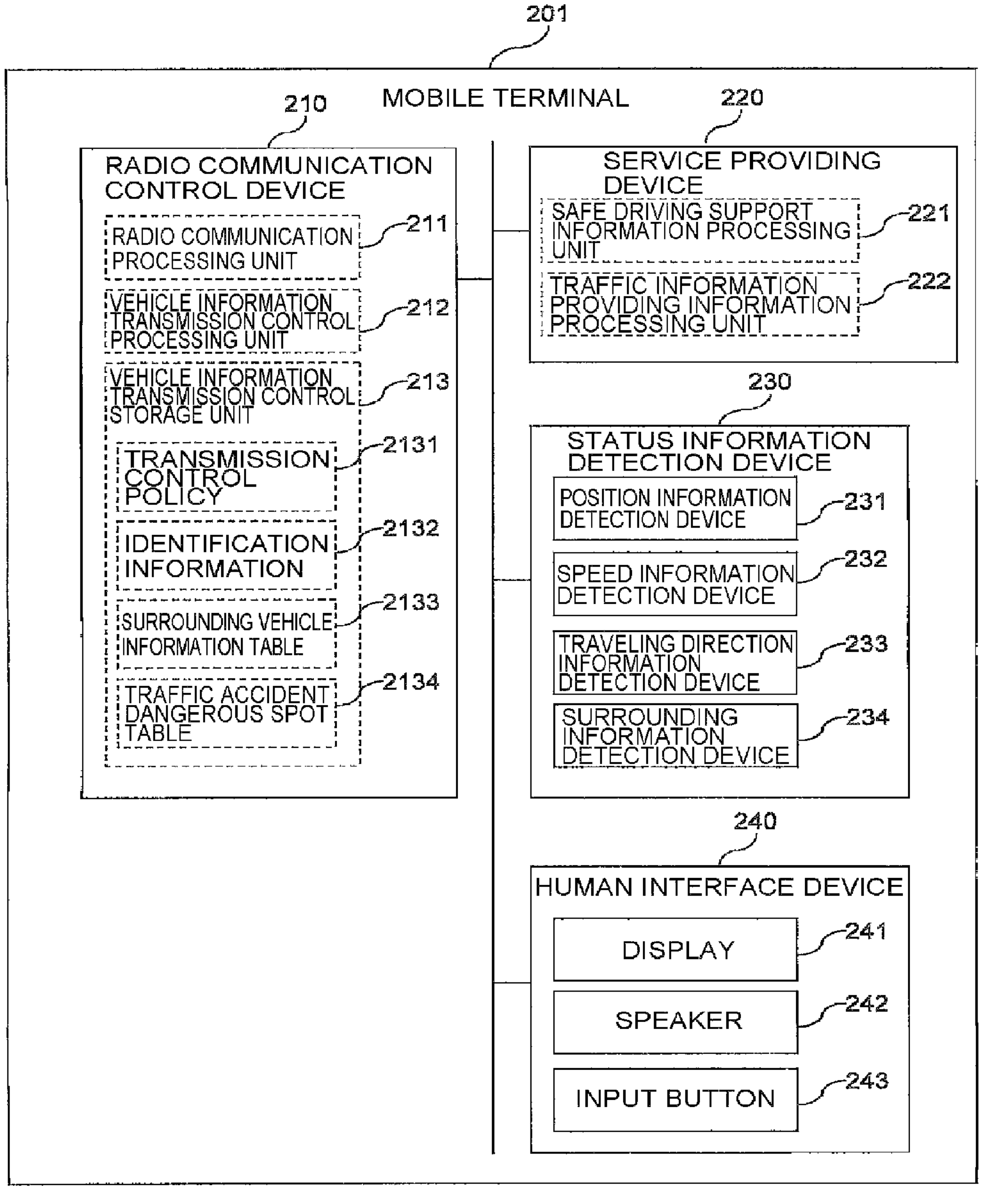
FIG. 2 is a diagram illustrating a block configuration of a device mounted on a vehicle of Example 1.

FIG. 2 is block diagram showing a configuration of a device (mobile terminal) mounted on a vehicle (mobile device) of Example 1. A mobile terminal 201 has a radio communication control device 210, a service providing device 220, a status information detection device 230, and a human interface device 240. The mobile terminal 201 may be a device that an occupant or the like of the vehicle 101 carries instead of a device mounted on the vehicle 101. The radio communication control device 210 is a device with which the vehicle 101 communicates with the other Vehicle 101 or the roadside device 102 and has a radio communication processing unit 211 configured to control radio communication, vehicle information transmission control processing unit 212 configured to perform transmission control of vehicle information, and a vehicle information transmission control storage unit 213 configured to store information used by the vehicle information transmission control processing unit 212. A processing flow of the vehicle information transmission control processing unit 212 is described later in FIG. 6, FIG. 10, and FIG. 11. The vehicle information transmission control storage unit 213 stores a transmission control policy 2131, identification information 2132, a surrounding vehicle information table 2133, and a traffic accident dangerous spot table 2134 of the vehicle 101. In the transmission control policy 2131, described is information for performing transmission control of vehicle information, such as various kinds of threshold values, when determining the possibility of vehicle information misuse, the effect of vehicle information transmission control, and the magnitude of the adverse influence on the service. The identification information 2132 is information for identifying the vehicle 101 and stored in plurality. In Example 1, a plurality of pieces of identification information is stored in advance, but, it may also be possible generate identification information by the vehicle information transmission control processing unit 212 when updating identification information, or to acquire identification information from a storage medium, or to acquire identification information from the service server 103 via communication. The surrounding vehicle information table 2133 is a table of information about vehicles existing around the own vehicle 101 and as shown in FIG. 3, has identification information 301 for identifying a vehicle, a recognition start position 302 indicating the position where it is initially recognized that there exists a vehicle around, and a latest recognition position 303 indicating the latest position where it is recognized that there exists a vehicle around. As the recognition start position 302 and the latest recognition position 303, time may be used in place of position, or both time and position may be used.

Figure 5:
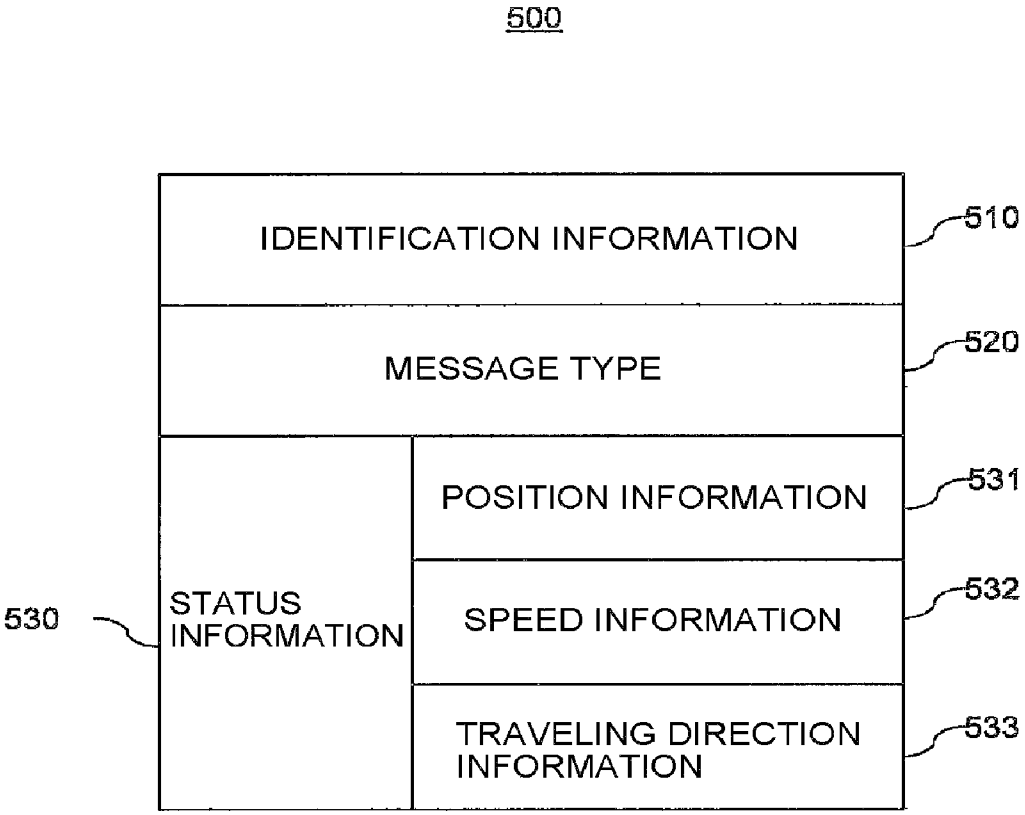
FIG. 5 is a diagram illustrating a format of vehicle information that a vehicle transmits of Example 1.

The vehicle information transmission control processing unit 212 periodically transmits vehicle information, such as that as shown in FIG. 5, which will be explained later, to the vehicle 101 and the roadside device 102 around.

As to the vehicles existing around, the vehicle information of all the vehicles 101 having received the vehicle information illustrated in FIG. 5, or the vehicle information of the vehicles 101 in the same traveling direction is registered in the surrounding vehicle information table 2133. It may also be possible to recognize surrounding vehicles by using the status information detection device 230 and to register the vehicle information in the surrounding vehicle information table 2133. The vehicle information registered in the surrounding vehicle information table 2133 is checked periodically and in the case where the distance between the latest recognition position 303 and the current position is a predetermined value or more, it is recognized that the vehicle no longer exists around and the vehicle information is deleted from the surrounding vehicle information table 2133.

The traffic accident dangerous spot table 2134 is information indicating a position where the risk of traffic accident is high, and as shown in FIG. 4, has position information 410, and date/day of week/time information 420. The position information 410 is information indicating a position where the risk of traffic accident is high, and the date/day of week/time information 420 is information indicating the date/day of week/time when the risk of traffic accident is high. It may also be possible to set the traffic accident dangerous spot table 2134 in advance via a storage medium or communication, or to periodically acquire the table from the roadside device 102 or the service server 103.

The service providing device 220 is a device configured perform information processing to provide a service to a user and has a plurality of service information processing units. In Example 1, the service providing device 220 has a safe driving support information processing unit 221 and a traffic information providing information processing unit 222. The safe driving support information processing unit 221 performs the safe driving support service to detect a risk, such as collision and rear-end collision, based on the vehicle information received from the other vehicle 101 or the roadside device 102 via radio communication and the information of the own vehicle 101 acquired from the status information detection device 230 and notify a user of the risk via the human interface device 240. The traffic information providing information processing unit 222 performs the traffic information providing service to receive and process traffic information of the destination of the vehicle 101 distributed from the service server 103 via the roadside device 102, and notify a user of the traffic information from the human interface device 240.

The status information detection device 230 is a device configured to detect a status of the vehicle 101 and there exists a plurality of status information detection devices. In Example 1, the status information detection device 230 has a position information detection device 231, a speed information detection device 232, a traveling direction information detection device 233, and a surrounding information detection device 234, but, not necessarily limited to these. The position information detection device 231, the speed information detection device 232, the traveling direction information detection device 233, and the surrounding information detection device 234 may include the GPS (Global Positioning System), a speed meter, direction indicator and a steering angle sensor, and a navigation device and a camera, respectively, but, are not necessarily limited to these. The human interface device 240 is an interface with a user and has a display 241, a speaker 242, and an input button 243, but, not necessarily limited to these.

The functions of the radio communication control device 210 and the service providing device 220 can be implemented by the central processing unit (hereinafter, CPU) executing programs stored in the storage device in the information processing device including the CPU, the storage device, the communication device, etc. The programs may be stored in the storage device in advance, or may be introduced from the storage medium or from another device via communication when necessary. In the device 201 in Example 1, the radio communication control device 210, the service providing device 220, the status information detection device 230, and the human interface device 240 communicate with one another via various kinds of on-vehicle LAN (Local Area Network), but, for example, the radio communication control device 210, the service providing device 220, the status information detection device 230, and the human interface device 240 may be implemented as one device.

Figure 14:
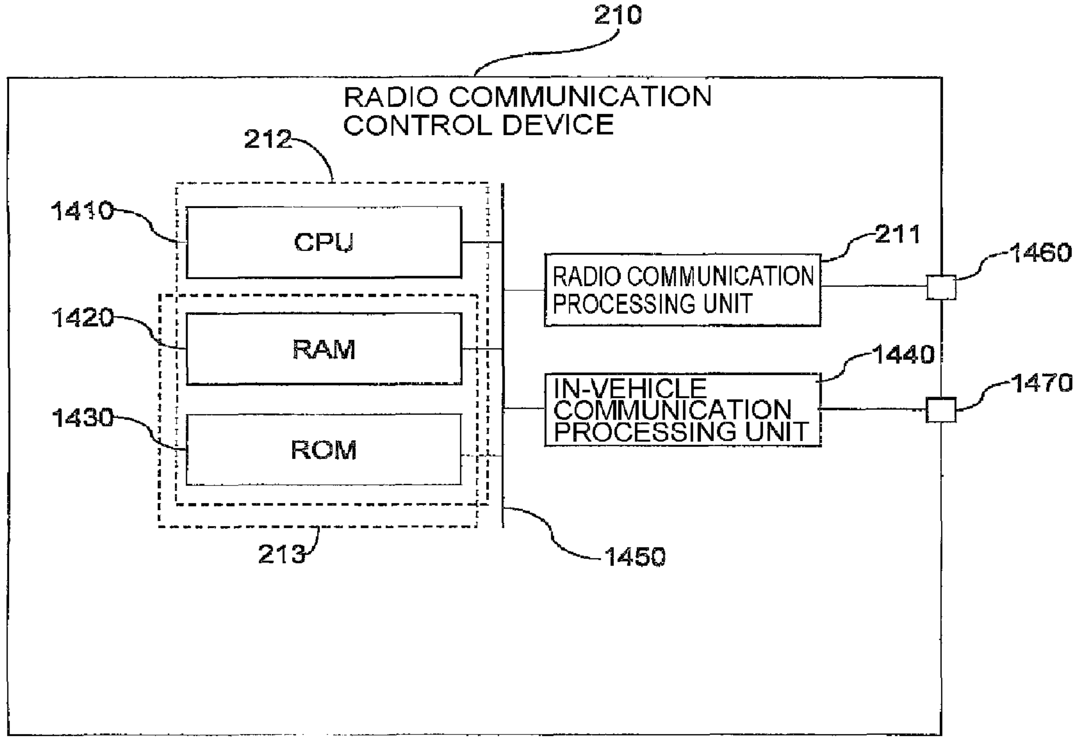
FIG. 14 is an outline hardware configuration diagram of a radio communication control device of Example 1.

FIG. 14 is an outline hardware configuration diagram of the radio communication control device 210. The outline hardware configuration of the radio communication control device 210 is explained using FIG. 14.

In FIG. 14, a CPU 1410 performs some kind of operation and control processing according to programs. A RAM (volatile storage device) 1420 is used as a work area of the CPU 1410 and stores various kinds of operation and control data. A ROM (nonvolatile storage device) 1430 stores programs used in the CPU 1410. The RAM 1420 includes one of a static memory (SRAM) and a dynamic memory (DRAM) or includes both the SRAM and the DRAM. The ROM 1430 includes an electrically alterable nonvolatile memory, such as a flash memory, a magnetoresistive RAM (MRAM), a resistive memory (ReRAM), and a phase change memory.

An in-vehicle communication processing unit 1440 is used by the radio communication control device 210 to communicate with a device, such as the service providing device 220, mounted in the mobile terminal 201 of the own vehicle 101. A bus 1450 is a plurality of signal lines for transmitting and receiving control signals, addresses, and data to and from a device, such as the CPU 1410, configuring the radio communication control device 210. A communication connection end 1460 and a communication connection end 1470 are each an arbitrary connector by which the radio communication control device 210 communicates with another device or the like, not shown schematically, via the radio communication processing unit 211 and the in-vehicle communication processing unit 1440. In FIG. 14, the radio communication processing unit 211, the vehicle information transmission control processing unit 212, and the vehicle information transmission control storage unit 213 are the same as those explained in FIG. 2, and therefore, explanation thereof is omitted.

The radio communication control device 210 controls the radio communication processing unit 211 and the in-vehicle communication processing unit 1440 and performs necessary radio communication control according to a predetermined processing procedure stored in the ROM 1430 by using the RAM 1420.

In Example 1, the function of the vehicle information transmission control processing unit 212 is realized by the CPU 1410, the RAM 1420, and the ROM 1430. The function of the vehicle information transmission control storage unit 213 is realized by the RAM 1420 and the ROM 1430. It is described above that the radio communication processing unit 211 and the in-vehicle communication processing unit 1440 are realized by the dedicated hardware devices, but, the configuration is not necessarily limited to the above and any realization measure may be taken to realize each function. It may also be possible to form the CPU 1410, the RAM 1420, the ROM 1430, and the bus 1450 over one semiconductor substrate to provide one semiconductor integrated circuit device. It may also be possible to provide one semiconductor integrated circuit device by forming the CPU 1410, the RAM 1420, and the ROM 1430 over different semiconductor substrates, respectively, and by packaging the three semiconductor substrates into one semiconductor package. In this case, the data bus 1450 is provided over the semiconductor substrate over which any of the CPU 1410, the RAM 1420, and the ROM 1430 is formed.

Although detailed explanation is omitted, the hardware configurations of the service providing device 220, the status information detection device 230, and the human interface device 240 to be mounted on the mobile terminal 201 are the same as that of the radio communication control device 210 and each function may be realized arbitrarily.

FIG. 5 shows an example of vehicle information that the vehicle 101 transmits in the safe driving support service. Vehicle information 500 has identification information 510 for identifying the vehicle 101, a message type 520 for identifying the type of a message, and status information 530 including position information 531 indicating the current position of the vehicle 101, speed information 532 indicating the moving speed, and traveling direction information 533 indicating the traveling direction. The status information 530 may include information other than the position information 531, the speed information 532, and the traveling direction information 533.

Figure 6:
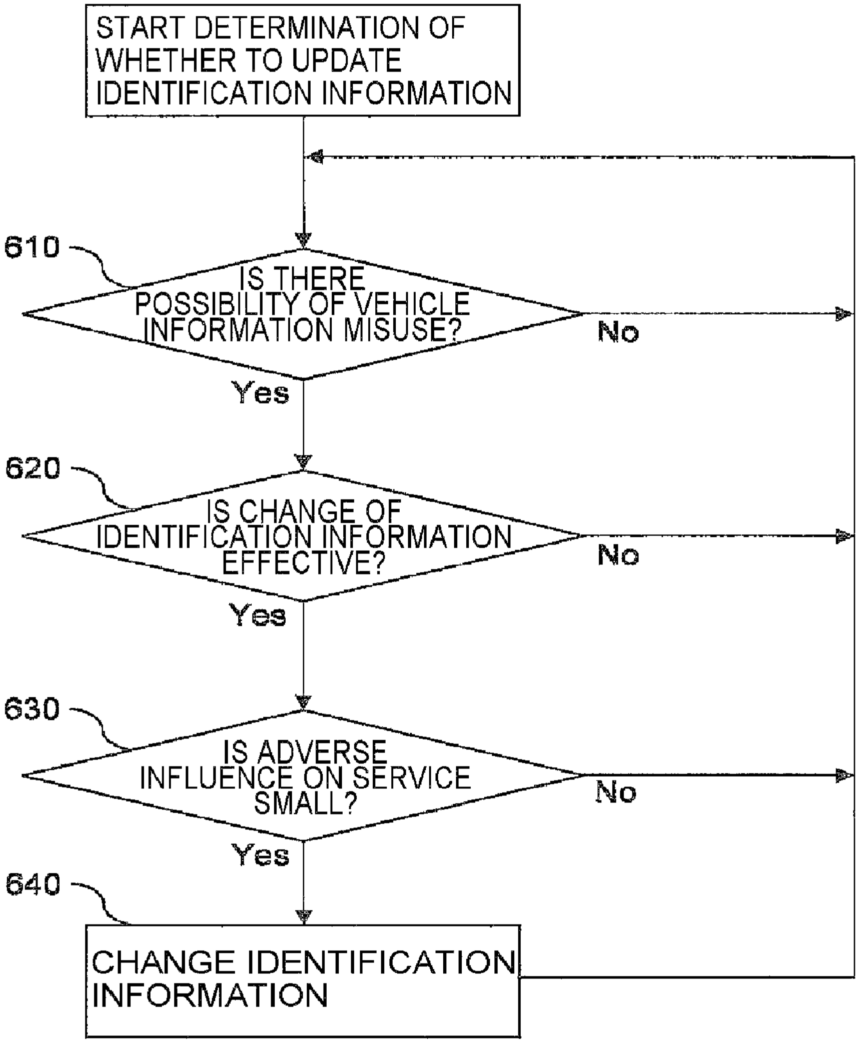
FIG. 6 is a processing flowchart illustrating vehicle information transmission control processing of Example 1.

FIG. 6 is a diagram showing a processing flow of the vehicle information transmission control processing unit 212 of the radio communication control device 210. In Example 1, the transmission control of vehicle information is performed by changing identification information. The vehicle information transmission control processing unit 212 detects the possibility that the vehicle information of the vehicle 101 is misused for tracking of the own vehicle at step 610 and in the case where the possibility of misuse for tracking of the own vehicle is determined to exist (in the case of Yes), the procedure proceeds to step 620 and in the other case (in the case of No), after a predetermined time elapses, the possibility of vehicle information misuse for tracking of the own vehicle is determined again at step 610.

At step 620, the effect in the case where the identification information is updated is checked and in the case where it is determined to be effective (in the case of Yes), the procedure proceeds to step 630 and in the case where it is determined to be not effective (in the case of No), after a predetermined time elapses, the procedure, returns to step 610 and whether or not the possibility of vehicle information misuse for tracking of the own vehicle lasts is detected.

At step 630, the possibility of adverse influence on the service provided by the service providing device 220 in the case where the identification information is changed is determined, and in the case where the possibility of adverse influence is low (in the case of Yes), the procedure proceeds to step 640. In the case where the possibility of adverse influence is high (in the case of No), after a predetermined time elapses, the procedure returns to step 610 and whether or not the risk of vehicle information misuse for tracking of the own vehicle lasts is detected. At step 640, identification information different from the identification information currently in, use is used among a plurality of pieces of identification information 2132 stored in the vehicle information transmission control storage unit 213. For example, the vehicle has a plurality of pieces of identification information in advance, and identification information different from that currently in use is selected and the selected identification information is used thereafter. It may also be possible to obtain new identification information from the outside of the vehicle and use the new identification information.

Figure 7:
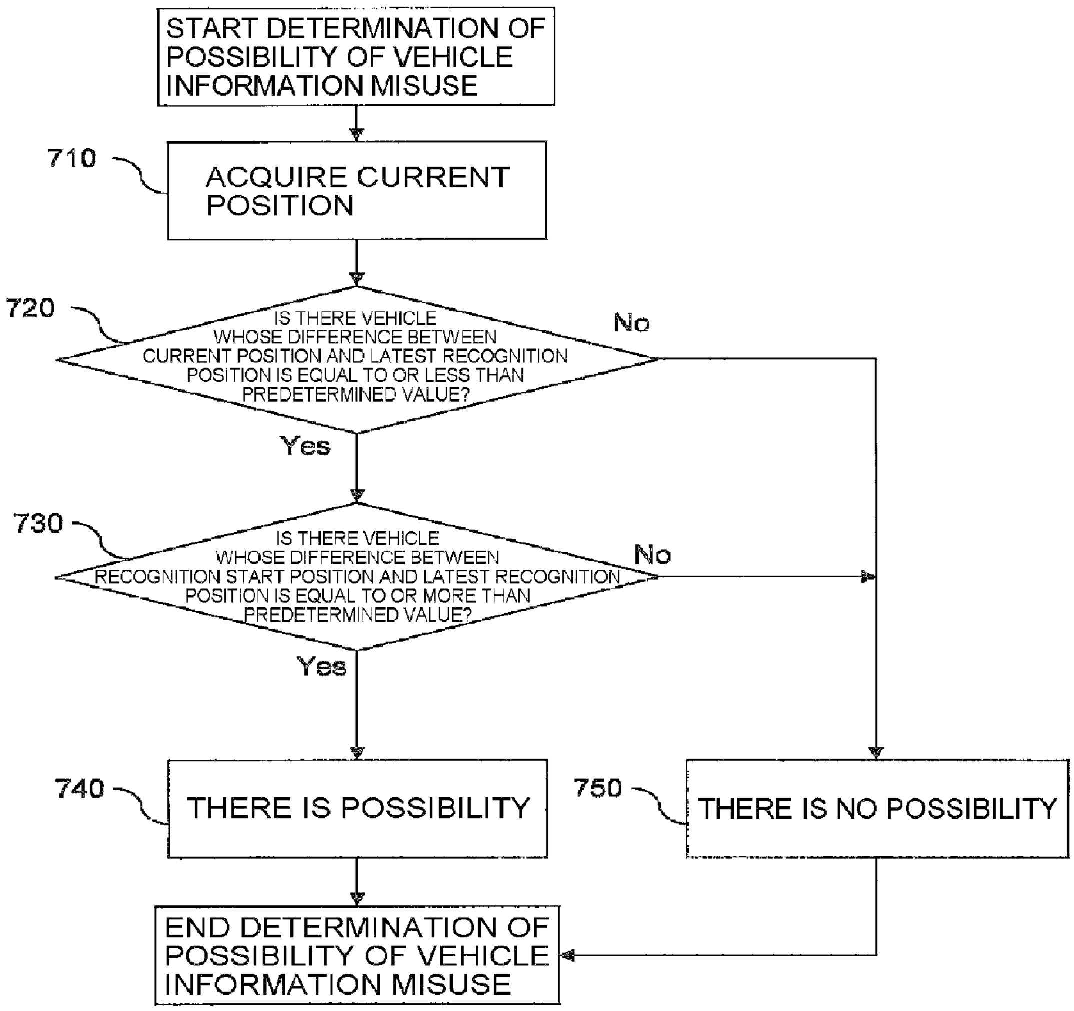
FIG. 7 is a processing flowchart illustrating processing to determine the possibility of vehicle information misuse of Example 1.
Figure 8:
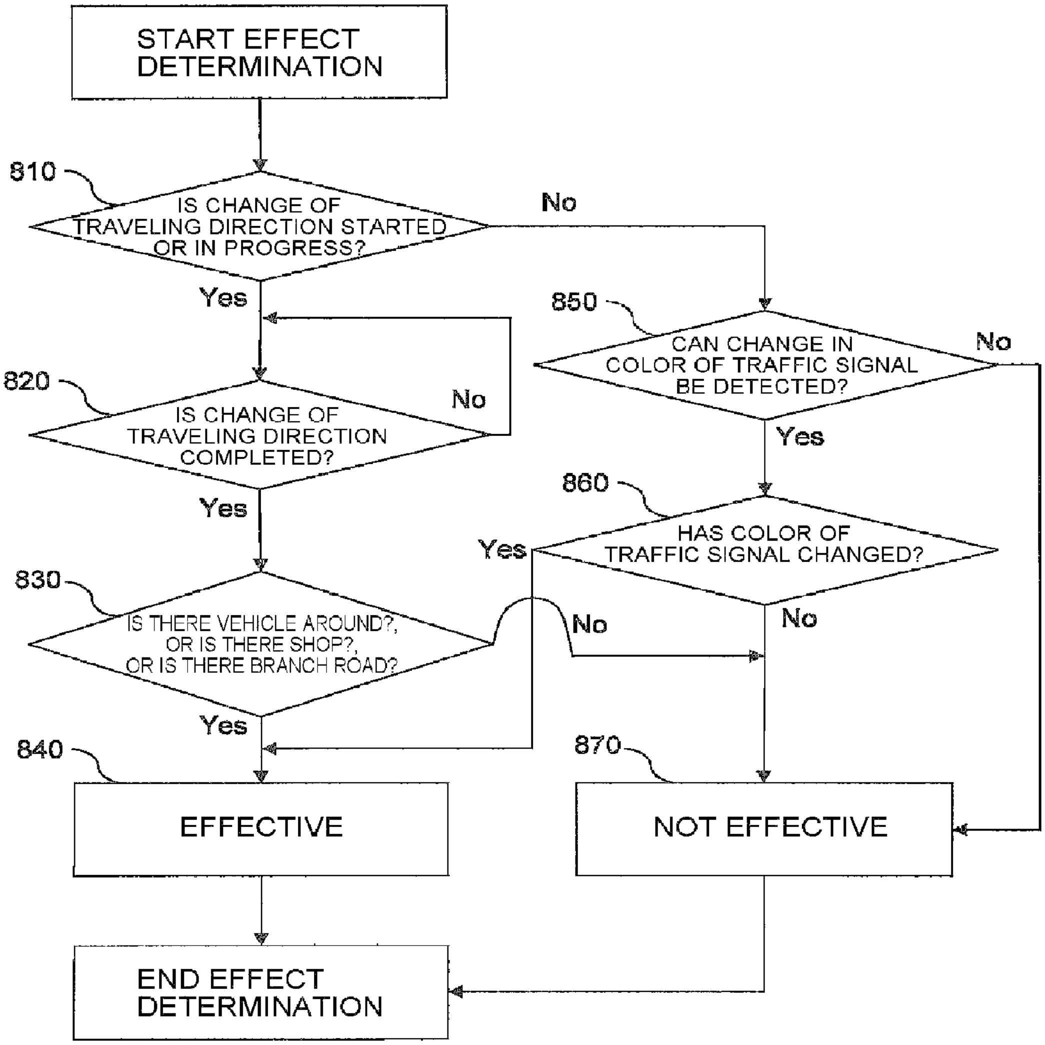
FIG. 8 is a processing flowchart illustrating processing to determine the effect of vehicle information transmission control of Example 1.
Figure 9:
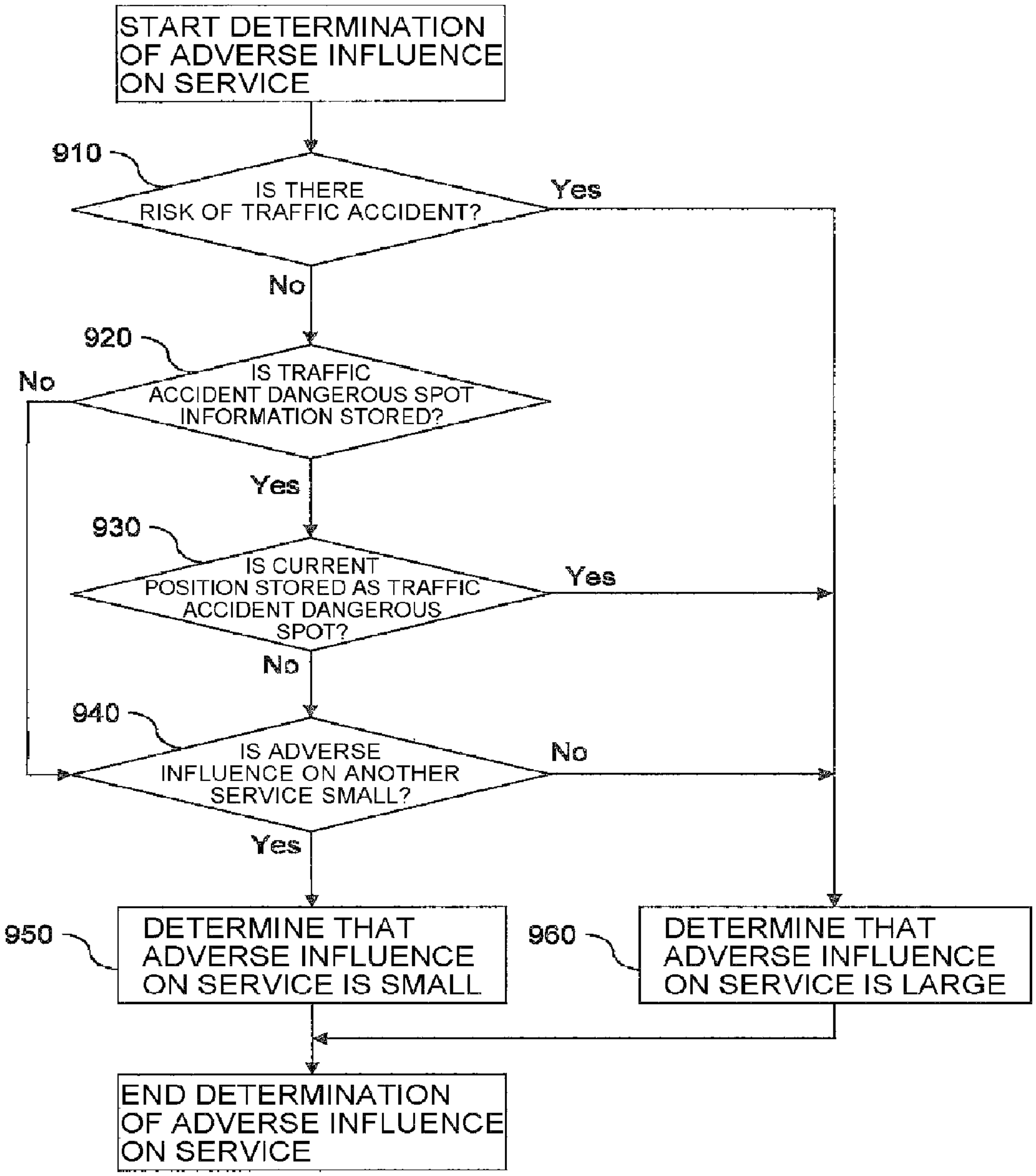
FIG. 9 is a processing flowchart illustrating processing to determine the adverse influence on service of Example 1.

The processing to determine the possibility of vehicle information misuse for tracking of the own vehicle at step 610, the processing to determine the effect of the update of identification information at step 620, and the processing to determine the magnitude of adverse influence on the service at step 630 are described using FIG. 7, FIG. 8, and FIG. 9, respectively.

FIG. 7 is a diagram illustrating a processing flow to determine the possibility of vehicle information misuse for tracking of the own vehicle. Whether or not the possibility of vehicle information misuse for tracking of the own vehicle exists is determined depending on whether or not the same vehicle exists around, even after the own vehicle has traveled a predetermined distance or more.

At step 710, the current position information of the own vehicle is acquired from the position information detection device 231 and then the procedure proceeds to step 720. At step 720, it is checked whether or not there exists vehicle information in which the difference between the position information acquired at step 710 and the latest recognition position 303 is not more than a predetermined value in the vehicle information registered in the surrounding vehicle information table 2133. In the case where there exists such vehicle information (in the case of Yes), the procedure proceeds to step 730 and in the case where not (in the case of No), it is determined that there is not such a possibility at step 750 and the processing is ended. At step 730, it is checked whether or not there exists vehicle information in which the difference between the recognition start position 302 and the latest recognition position 303 is not less than a predetermined value in the vehicle information extracted at step 720. In the case where there exists such vehicle information (in the case of Yes), it is determined that there is such a possibility at step 740 and in the case where not (in the case of No), it is determined that there is not such a possibility at step 750 and the processing is ended. As described above, in the case where there exists a vehicle in which the difference between the current position information acquired at step 710 and the latest recognition position 303 is not more than a predetermined value and the difference between the recognition start position 302 and the latest recognition position 303 of the vehicle is not less than a predetermined value, it is regarded that this vehicle exists around the own vehicle for a predetermined distance or more. Even in the situation where the possibility of vehicle information misuse is not detected in the processing flow illustrated in FIG. 7, in the case where there is an input from the user through the input button 243 indicating that there is a possibility of misuse, the possibility of vehicle information misuse is determined to exist at step 610 in FIG. 6 and the procedure proceeds to step 620.

The surrounding vehicle information table 2133 in FIG. 3 includes the identification information 301, the recognition start position 302, and the latest recognition position 303, and therefore, in the processing flow shown in FIG. 7, the possibility of vehicle information misuse for tracking of the own vehicle is determined by distance, but, in the case where the surrounding vehicle information table 2133 includes identification information, a recognition start time, and a latest recognition time, whether or not the possibility of vehicle information misuse for tracking of the own vehicle exists is determined by time. In the case where the surrounding vehicle information table 2133 includes position information and time information, whether or not the vehicle information is misused for tracking of the own vehicle is determined by position and time.

FIG. 8 is a diagram illustrating a processing flow to determine whether or not the vehicle 101 likely to track the own vehicle can no longer misuse the vehicle information of the own vehicle in the case where the transmission control of the vehicle information is performed. The first condition that the vehicle information can no longer be misused is the case where the traveling direction is changed and the case where it is possible to confuse the tracking vehicle because of the existence of another vehicle, a shop, a branch road, etc., therearound. The second condition is supposed to be the case where the color of the traffic signal changed after the own vehicle passed through the traffic signal.

At step 810, the current traveling direction information of the own vehicle is acquired from the traveling direction information detection device 233 and whether or not the change of traveling direction is in progress is determined. In the case where the change of traveling direction is in progress (in the case of Yes), the procedure proceeds to step 820 and after waiting until the change of traveling direction is completed, the procedure proceeds to step 830. In the case where the traveling direction is not changed (in the case of No), the procedure proceeds to step 850 and whether or not the change in color of the traffic signal can be detected is determined (step 850). In the case where detection is not possible (in the case of No), the change of vehicle information is determined to be not effective and the processing is ended (step 870). In the case where detection is possible (in the case of Yes), whether or not the vehicle has passed through the traffic signal and the color of the traffic signal has changed is determined (step 860). In the case where the conditions are determined to be met at step 860 (in the case of Yes), the procedure proceeds to step 840. In the other case (in the case of No), the change of vehicle information is determined to be not effective and the processing is ended (the procedure proceeds to step 870). At step 830, the case where it is possible to confuse the tracking vehicle is detected in the manner as described below. Whether there is a vehicle around is determined by using the surrounding information detection device 234 or the surrounding vehicle information table 2133 or both. Surrounding facility information is acquired from the surrounding information detection device 234 and in the case where there exist a parking lot, a large-sized facility, etc., it is determined to be the case where it is possible to confuse the tracking vehicle. Alternatively, in the case where there exists a vehicle in which the distance between the latest recognition position and the current position information of the own vehicle acquired from the position information detection device 231 is not more than a predetermined value in the vehicle information described in the surrounding vehicle information table 2133, it is determined that there exists a vehicle around. Further, in the case where the surrounding facility information is acquired from the surrounding information detection device 234 and there exists a branch road, it is determined to be the case where it is possible to confuse the tracking vehicle. In the case where it is determined that the tracking vehicle can be confused at step 830 (in the case of Yes), the procedure proceeds to step 840 and the vehicle information transmission control is determined to be effective and the determination processing is ended. In the other case (in the case of No), the procedure proceeds to step 870 and the vehicle information transmission control is determined to be not effective and the determination processing is ended.

FIG. 9 is a diagram illustrating a processing flow to determine whether the magnitude of adverse influence on the service in the case where vehicle information transmission control is performed. At step 910, the degree of risk of traffic accident is checked from the safe driving support service provided by using the safe driving support information processing unit 221 of the service providing device 220 and in the case where the risk of traffic accident is determined to exist (in the case of Yes), the procedure proceeds to step 960 and the magnitude of adverse influence on the service is determined to be large and the determination processing is ended. In the other case (in the case of No), the procedure proceeds to step 920 and it is checked whether or not there is traffic accident dangerous spot information in the traffic accident dangerous spot table 2134. In the case where there is such information (in the case of Yes), the procedure proceeds to step 930 and in the case where there is not such information (in the case of No), the procedure proceeds to step 940. At step 930, it is checked whether or not the current position, date, day of week, and time are described in the traffic accident dangerous spot table 2134. In the case where they are described (in the case of Yes), the procedure proceeds to step 960 and the magnitude of adverse influence on the service is determined to be large and the determination processing is ended. In the case where they are not described (in the case of No), the procedure proceeds to step 940.

At step 940, the magnitude of adverse influence on services other than the safe driving support service provided by the service providing device 220 is determined. The conditions that the adverse influence is determined to be large differ from service to service. The traffic information providing information processing unit 222 determines whether or not the traffic jam information around the destination of the vehicle 101 is being acquired from the service server 103, which is a traffic information distribution server, via the roadside device 102, and in the case where the acquisition of traffic information is not completed yet (in the case of No), the procedure proceeds to step 960 and it is determined that the adverse influence on the service is large, and the determination processing is ended. In the case where traffic information, not limited to traffic jam information, is acquired, from the traffic information distribution server, whether or not the acquisition of traffic information is completed is determined. In the case where communication with the traffic information distribution server is not generated (in the case of Yes), the procedure proceeds to step 950, and it is determined that the adverse influence on the service is small and the processing is ended.

In Example 1, the processing to determine the possibility of vehicle information misuse for tracking of the own vehicle at step 610, the processing to determine the effect of identification information update at step 620, and the processing to determine the magnitude of adverse influence on the service at step 630 are as follows. In the case where it is determined that the possibility of misuse exists at step 610 (in the case of Yes), the procedure proceeds to step 620, in the case where it is determined that the update is effective at step 620 (in the case of Yes), the procedure proceeds to step 630, and in the case where it is determined that the adverse influence is small at step 630 (in the case of Yes), the procedure proceeds to step 640. However, the order of step 610, step 620, and step 630 may be interchanged sequentially. For example, step 630 and step 610 may be interchanged, step 610 may be placed at the position of step 620, step 620 may be placed at the position of step 630, step 630 may be placed at the position of step 610, and step 620 and step 630 may be interchanged. Even if this interchange is performed, the arrows of Yes and No in the operation flow in FIG. 6 remain unchanged.

It is preferable for both step 620 and step 630 to exist, but, one of them is also sufficient. It is preferable for the processing at step 630 to exist compared to the processing at step 620. The reason is that if the service provided by the service providing device is adversely affected, the safe driving support may be hindered, and if the safe driving support is hindered, the life of the occupant of the vehicle may be put in danger. Even if step 620 is removed, it is unlikely that the life of the occupant of the vehicle is put in danger, and there is an advantage that the burden of processing of the vehicle is reduced, and therefore, the priority of step 620 is low compared to step 630. In Example 1, the prevention of vehicle information (mobile device information) misuse is realized by a method that does not require a large amount of memory for the mobile terminal 201, that has a small processing load, or that gives small adverse influence on the service.

(1) After determining the possibility of mobile device information misuse, whether or not the transmission control of mobile device information is necessary is determined.

By doing so, it is only necessary to retain only the information of the mobile device whose mobile device information is likely to be misused and it is not necessary to retain all the mobile device information, and therefore, it is possible to reduce the amount of memory used.

(2) After determining the possibility of mobile device information misuse and determining the magnitude of adverse influence on the service, whether or not the transmission control of mobile device information is necessary is determined.

By doing so, it is possible to prevent the mobile device information to be used for the safe driving support service or the traffic information distribution service from being misused without adversely affecting the service for rediscovering the location of the mobile device in the case where the mobile device being tracked is lost.

(3) By taking into consideration the determination of the effect of transmission control of mobile device information, whether or not the transmission control of mobile device information is necessary is determined.

By doing so, it is possible to perform the transmission control of mobile device information with a timing at which the transmission control of mobile device information can be performed effectively.

(4) The determination of the possibility of mobile device information misuse is performed as follows. In the case where information of a mobile device existing around is retained, and the same mobile device exists around for a predetermined time or in a predetermined distance, there is a risk of being tracked, and therefore, it is determined that there is a possibility of mobile device information misuse.

By doing so, it is only necessary to retain only the information of the mobile device that exists around and it is not necessary to retain all the mobile device information, and therefore, the amount of memory used is small. By reducing the amount of memory used, it is possible to form the radio communication control device 210 over one semiconductor substrate. Even in the case where the radio communication control device 210 includes a plurality of semiconductor chips, it is possible to package them into one semiconductor package. Thereby, it is possible to downsize the radio communication control device 210.

(5) The determination of the effect of transmission control of mobile device information is performed as follows. The determination is performed depending on whether or not there is a possibility that the mobile device that exists around for a predetermined time or in a predetermined distance loses sight of the own mobile device. The case where there is a possibility of losing sight includes the case where there is a possibility that a vehicle other than the own mobile device exists around after the traveling direction has changed or the case where the color of the traffic signal has changed.

(6) The determination of the magnitude of adverse influence on the service is performed as follows. In the case of the safe driving support service, the determination is performed by determining the risk of occurrence of traffic accident. In the other services, the determination is performed by determining whether or not in communication with another device.

The transmission control to prevent the mobile device information misuse is performed by changing the identification information or by suspending the transmission of mobile device information. The suspension of the transmission of mobile device information is described in detail in the following modification.

In the case where the processing in (2) described above is applied, encryption processing is not performed, and therefore, it is not necessary for the device on the information reception side to perform processing to prevent the mobile device information misuse, such as decoding processing, and the processing load of the mobile terminal is reduced. In the case where the processing in (2) and (3) described above is applied, it is necessary for the device on the information transmission side to periodically perform the processing to determine the possibility of mobile device information misuse, the processing to determine the effect of the transmission control of mobile device information, and the processing to determine the magnitude of adverse influence on the service, but, the period of the processing may be longer than the period of the transmission of mobile device information, and therefore, the processing load is light compared to the case where the encryption processing is performed each time the mobile device information is transmitted.

(Modification 1)

A modification according to Example 1 is explained below together with the drawings. In Modification 1, only portions different from those of Example 1 are explained. In Example 1, in the case where there is a possibility of vehicle information misuse, the identification information is changed, but, in Modification 1, in the case where there is a possibility of vehicle information misuse, the transmission of vehicle information is suspended.

Figure 10:
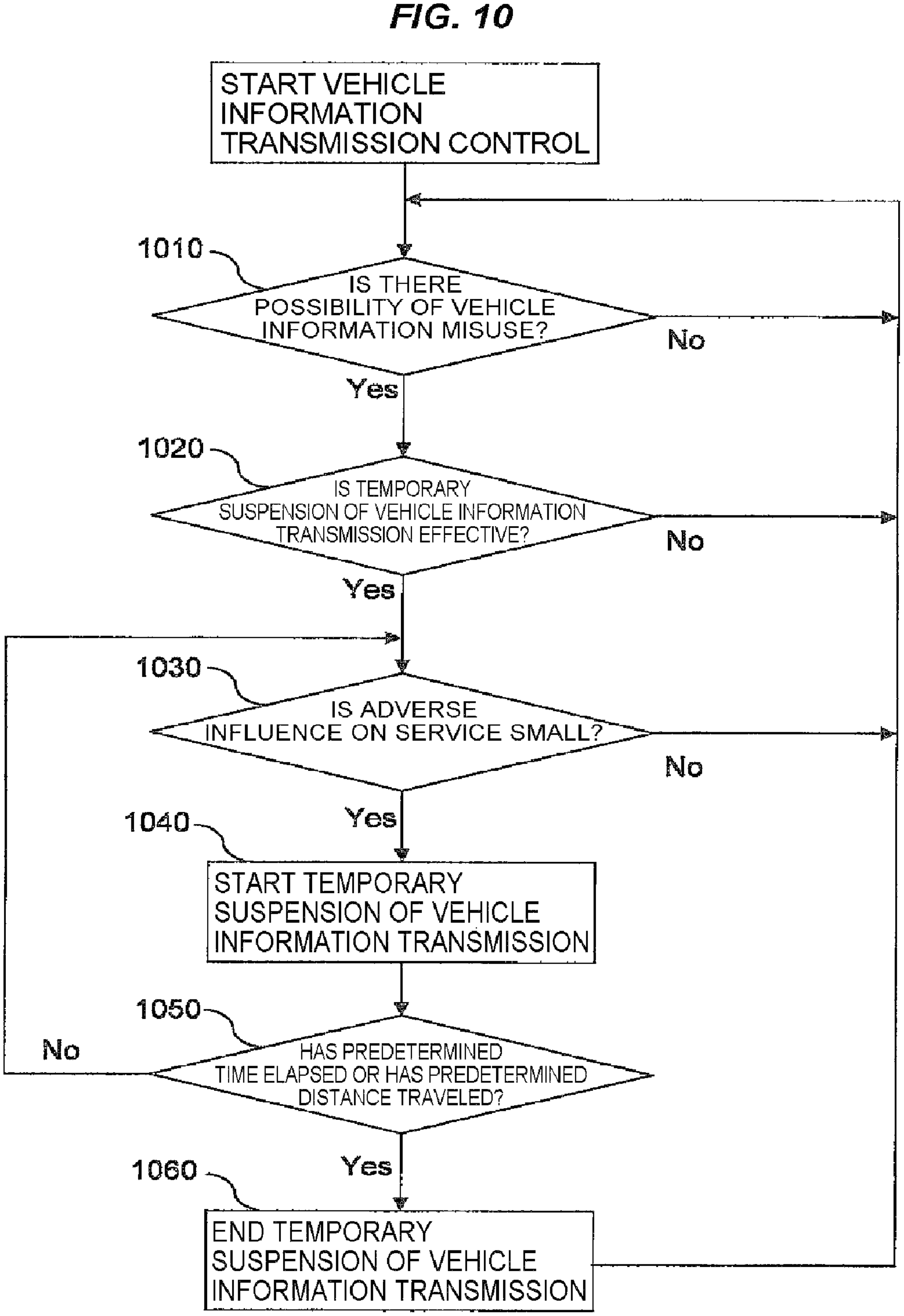
FIG. 10 is a processing flowchart illustrating vehicle information transmission control processing of Modification 1.

FIG. 10 is a diagram illustrating a processing flow of the vehicle information transmission control processing unit 212 of the radio communication control device 210 in Modification 1. In the case where it is determined that there is a possibility that the identification information that the vehicle 101 transmits is misused for tracking of the own vehicle at step 1010 (in the case of Yes), the procedure proceeds to step 1020 and in the other case (in the case of No), after a predetermined time elapses, the possibility of vehicle information misuse for tracking of the own vehicle is detected again at step 1010. The determination of the possibility of misuse of vehicle information of the vehicle 101 for tracking of the own vehicle is the same as that in the processing flow described in Example 1 and illustrated in FIG. 7. At step 1020, the effect in the case where the transmission of vehicle information is suspended is checked and in the case where it is determined to be effective (in the case of Yes), the procedure proceeds to step 1030 and in the case where it is determined to be not effective (in the case of No), after a predetermined time elapses, the procedure returns to step 1010 and whether or not the possibility of vehicle information misuse for tracking of the own vehicle lasts is detected. The determination of the effect in the case where the transmission of vehicle information is suspended is the same as that in the processing flow described in Example 1 and illustrated in FIG. 8. At step 1030, the possibility of adverse influence on the service provided by the service providing device 220 in the case where the transmission of vehicle information is suspended is determined and in the case where the adverse influence is small (in the case of Yes), the procedure proceeds to step 1040. The determination of the magnitude of adverse influence on the service is the same as that in the processing flow described in Example 1 and illustrated in FIG. 9.

In the case where the adverse influence is determined to be large at step 1030 (in the case of No), after a predetermined time elapses, the procedure returns to step 1010 and whether or not the risk that the vehicle information is misused for tracking of the own vehicle lasts is detected. At step 1040, the suspension of transmission of the vehicle information transmitted by the safe driving support information processing unit 221 is started and the procedure proceeds to step 1050. At step 1050, whether a predetermined time has elapsed from the start time of suspension of the transmission of vehicle information or whether a predetermined distance has been traveled from the position of transmission of the status information 530 is checked. In the case where it is determined that a predetermined time has elapsed or a predetermined distance has been traveled (in the case of Yes), the procedure proceeds to step 1060 and the transmission of vehicle information is resumed. In the other case (in the case of No), after the processing at step 1030 and step 1040 is performed until a predetermined time elapses or a predetermined distance is traveled, the processing to repeat the determination at step 1050 is performed. In the case where the adverse influence on the service is determined to be large (in the case of No) at step 1030 in the repeated processing loop, the suspension of the transmission of vehicle information is stopped and the transmission of vehicle information is resumed. After a predetermined time elapses, the procedure returns to step 1010 and whether or not the risk of vehicle information misuse for tracking of the own vehicle lasts is detected. As described above, due to the presence of step 1030 in the repeated processing loop, it is possible to reduce the risk of accident by transmitting vehicle information if it seems that the service is adversely affected during the suspension of transmission of vehicle information. By suspending the transmission of vehicle information, the vehicle information misuse is prevented.

As in Example 1, the order of step 1010, step 1020, and step 1030 may be interchanged sequentially. For example, step 1030 and step 1010 may be interchanged and step 1010 may be placed at the position of step 1020, step 1020 at the position of step 1030, and step 1030 at the position of step 1010, and step 1020 and step 1030 may be interchanged. Even if this interchange is performed, the arrows of Yes and No of the operation flow in FIG. 10 remain unchanged except for the following. In the case where steps are interchanged as described above, if it is determined that a predetermined time has not elapsed yet or a predetermined distance has not been traveled yet at step 1050, the procedure should be designed to return to the step of determining whether or not the adverse influence on the service is small.

In Modification 1, the transmission of mobile device information is suspended as the transmission control for preventing the mobile device information misuse, instead of changing the identification information as in Example 1. As in Example 1, it is possible to realize the prevention of mobile device information misuse by a method that does not require a large amount of memory for the mobile terminal, that has a small processing load, or that gives small adverse influence on the service.

(Modification 2)

Another modification according to Example 1 is explained below together with the drawings. In Modification 2, only portions different from those of Example 1 and Modification 1 are explained. In Modification 2, in the case where it is determined that there is a possibility of vehicle information misuse, whether the identification information is updated or the transmission of vehicle information is suspended is determined each time.

Figure 11:
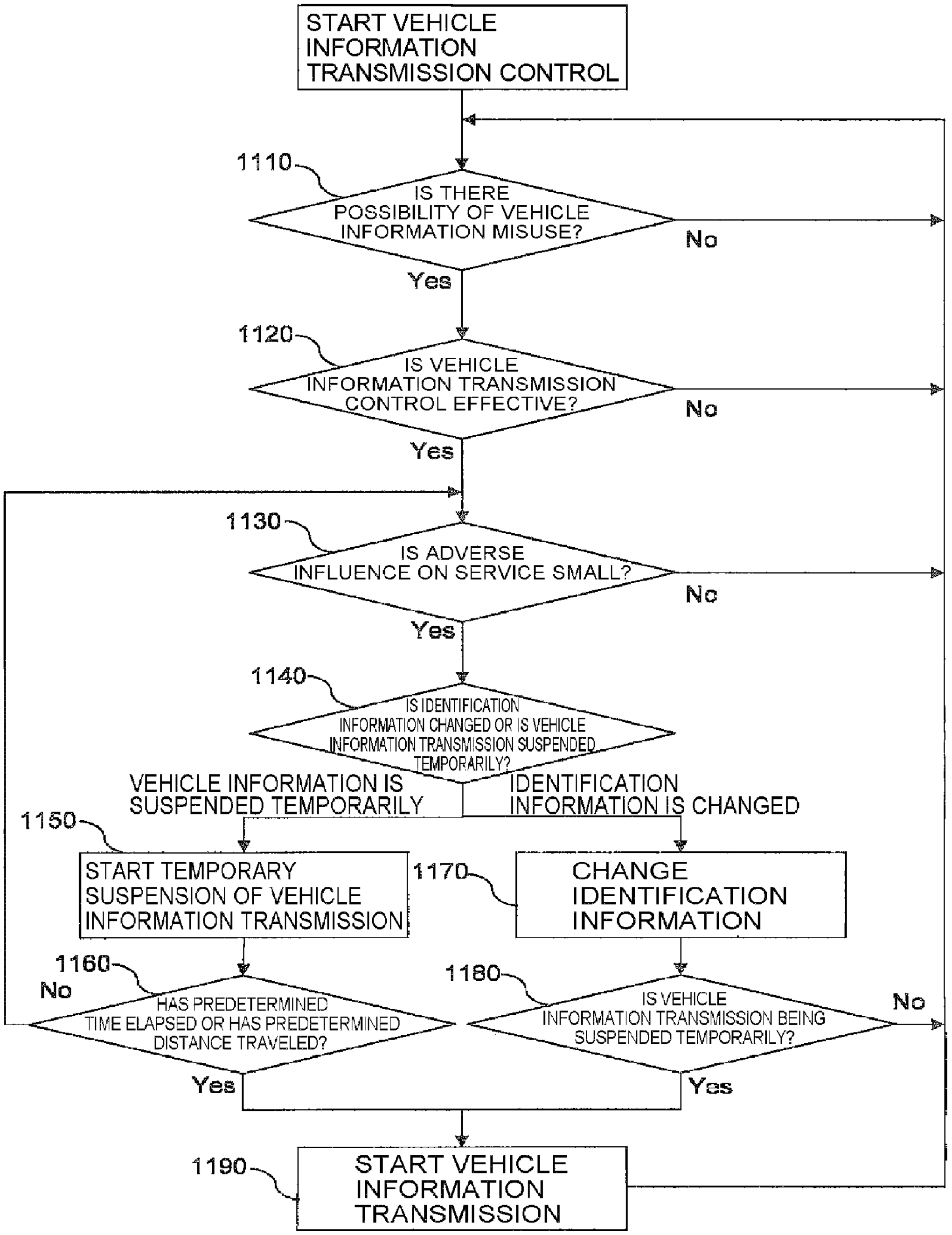
FIG. 11 is a processing flowchart illustrating vehicle information transmission control processing of Modification 2.

FIG. 11 is a diagram illustrating a processing flow of the vehicle information transmission control processing unit 212 of the radio communication control device 210 in Modification 2. At step 1110, the possibility of misuse of vehicle information of the vehicle 101 for tracking of the own vehicle is determined and in the case where it is determined that there is a risk of misuse for tracking of the own vehicle (in the case of Yes), the procedure proceeds to step 1120 and in the other case (in the case of No), after a predetermined time elapses, the possibility of vehicle information misuse for tracking of the own vehicle is detected again at step 1110. The determination of the possibility of misuse of the vehicle information of the vehicle 101 for tracking of the own vehicle is the same as that in the processing flow described in Example 1 and illustrated in FIG. 7. At step 1120, the effect in the case where the transmission control of vehicle information is performed is checked and in the case where it is determined to be effective (in the case of Yes), the procedure proceeds to step 1130 and in the case where it is determined to be not effective (in the case of No), after a predetermined time elapses, the procedure returns to step 1110 and the determination of whether or not the possibility of vehicle information misuse for tracking of the own vehicle lasts is performed. The determination of whether or not the transmission control of vehicle information is effective is the same as that in the processing flow described in Example 1 and illustrated in FIG. 8.

At step 1130, the magnitude of adverse influence on the service provided by the service providing device 220 in the case where the transmission control of vehicle information is performed is determined and in the case where the adverse influence is small (in the case of Yes), the procedure proceeds to step 1140. The determination of the magnitude of adverse influence on the service is the same as that in the processing flow described in Example 1 and illustrated in FIG. 9. In the case where the adverse influence is determined to be large at step 1130 (in the case of No), after a predetermined time elapses, the procedure returns to step 1110 and the determination of whether or not the possibility of vehicle information misuse for tracking of the own vehicle lasts is performed.

At step 1140, the safe driving support information processing unit 221 determines whether to change the identification information or to perform the suspension of the transmission of vehicle information. In the case where the transmission of vehicle information is suspended (in FIG. 11, described as "vehicle information"), the procedure proceeds to step 1150 and after whether a predetermined time has elapsed or a predetermined distance has been traveled is checked at step 1160, the transmission of vehicle information is started at step 1190 and the procedure returns to step 1110. In the case where it is determined to change the identification information at step 1140 (in FIG. 11, described as "identification information"), the procedure proceeds to step 1170 and from among the plurality of pieces of identification information 2132 stored in the vehicle information transmission control storage unit 213, identification information different from the identification information currently in use is selected and the selected identification information is used afterward. In the case where it is determined that the suspension of the transmission of vehicle information is being performed at step 1180 (in the case of Yes), the procedure proceeds to step 1190 and after the transmission of vehicle information is resumed, the procedure returns to step 1110 and the possibility of identification information misuse is determined. In the case where it is determined that the suspension of the transmission of vehicle information is not performed at step 1180 (in the case of No), the procedure returns to step 1110.

In the case where the processing step reaches step 1160, after the processing at step 1130, step 1140, and step 1150 is performed until a predetermined time elapses or a predetermined distance is traveled, the processing to repeat the determination at step 1160 is performed. In the case where the possibility that the service is adversely affected is high (in the case of No) at step 1130 in the repeated processing loop, the suspension of the transmission of vehicle information is stopped and the transmission of vehicle information is resumed. After a predetermined time elapses, the procedure returns to step 1110 and whether or not the risk of vehicle information misuse for tracking of the own vehicle lasts is detected. As described above, due to the presence of step 1130 in the repeated processing loop, it is possible to reduce the risk of accident by transmitting vehicle information if it seems that the service is adversely affected during the suspension of transmission of vehicle information.

As in Example 1, the order of step 1110, step 1120, and step 1130 may be interchanged sequentially. For example, step 1130 and step 1110 may be interchanged and step 1110 may be placed at the position of step 1120, step 1120 at the position of step 1130, and step 1130 at the position of step 1110, and step 1120 and step 1130 may be interchanged. Even if this interexchange is performed, the arrows of Yes and No of the operation flow in FIG. 11 remain unchanged except for the following case. In the case where steps are interchanged as described above, if it is determined that a predetermined time has not elapsed yet or a predetermined distance has not been traveled yet at step 1160, the procedure should be designed to return to the step of determining whether or not the adverse influence on the service is small.

In Modification 2, as the transmission control for preventing the mobile device information misuse, whether the mobile device information is updated or the transmission of mobile device information is suspended is determined each time, which is a combination of Example 1 and Modification 1. As in Example 1 and Modification 1, it is possible to realize the prevention of mobile device information misuse by a method that does not require a large amount of memory for the mobile terminal, that has a small processing load, or that gives the small adverse influence on the service.

Example 2

A mobile terminal of another example according to the embodiment is explained below together with the drawings. In Example 2, portions different from those of Example 1 and Modification 2 are explained. Example 2 has the function configuration shown in Example 1 or in Modification 2, and in which a predetermined operation is performed and at the same time, in the case where it is determined to change identification information, the change of information that needs to be changed accompanying the change of identification information is performed. The mobile device of Example 2 is also used in the vehicle-to-vehicle/road-to-vehicle communication system explained in FIG. 1 of Example 1.

Figure 12:
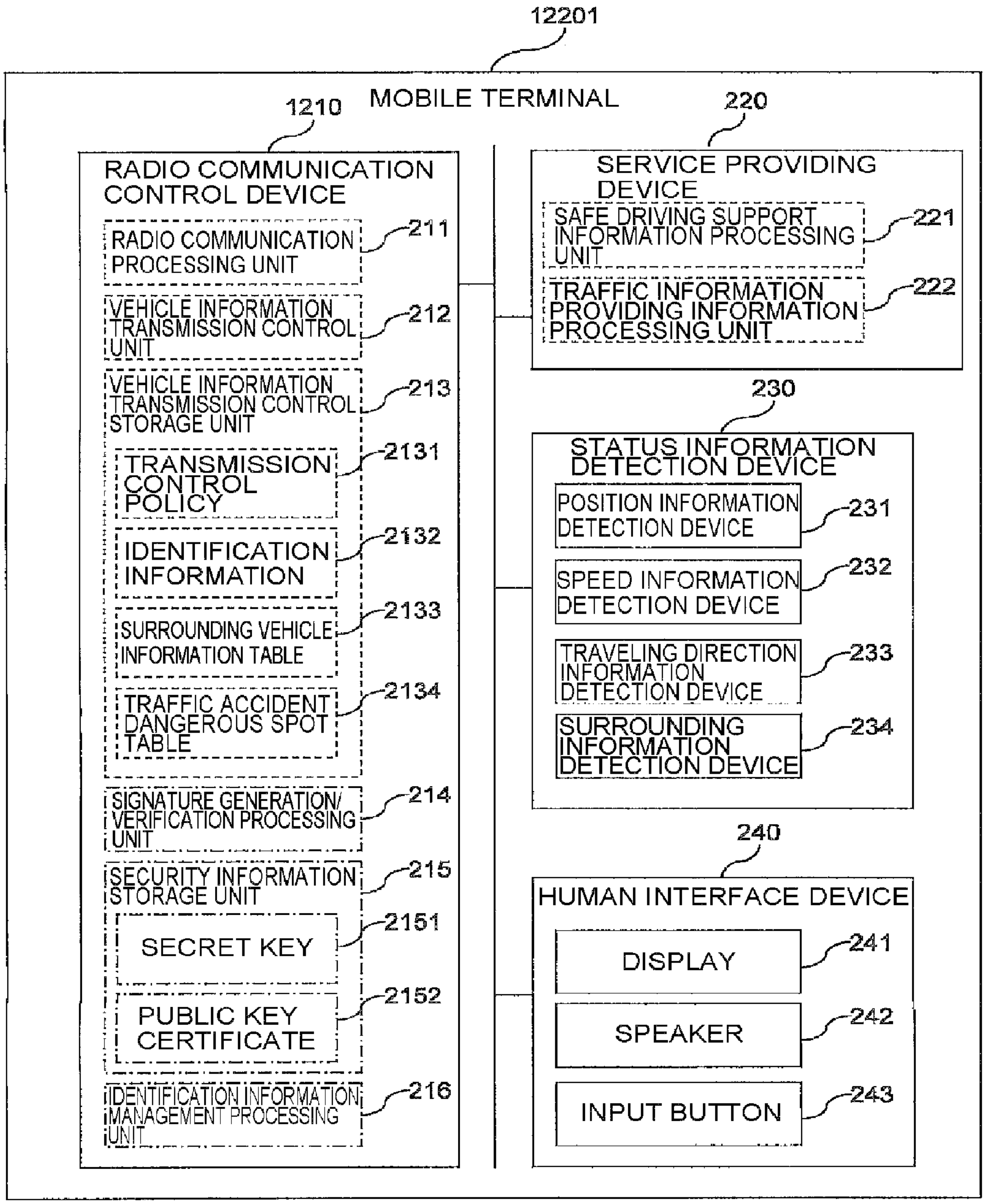
FIG. 12 is a block diagram showing a configuration of a device mounted on a vehicle in Example 2.

FIG. 12 is a block diagram showing a configuration of a device (mobile terminal) to be mounted on a vehicle in Example 2. A mobile terminal 12201 to be mounted on the vehicle 101 has a radio communication control device 1210, the service providing device 220, the status information detection device 230, and the human interface device 240. Portions different from those of the mobile terminal 201 shown in FIG. 2 are explained and explanation of the same portions is omitted. The radio communication control device 1210 of Example 2 has a signature generation/verification processing unit 214, a security information storage unit 215, and an identification information management processing unit 216 in addition to the radio communication processing unit 211, the vehicle information transmission control processing unit 212, and the vehicle information transmission control storage unit 213.

The signature generation/verification processing unit 214 performs signature generation for guaranteeing the authenticity and integrity of information that the vehicle 101 transmits, and signature verification for verifying the authenticity and integrity of information that the vehicle 101 receives. The security information storage unit 215 stores a secret key 2151 and a public key certificate 2152 necessary for signature generation/verification. The secret key 2151 is a key necessary when generating a signature and the public key certificate 2152 is transmitted to the other vehicle 101 in order to verify the signature generated by the vehicle 101. The public key certificate 2152 includes a public key corresponding to the secret key 2151, the identification information 2132, etc. Consequently, the secret keys 2151 and the public key certificates 2152 exist in the number corresponding to the number of pieces of identification information 2132. In Example 2, a plurality of pieces of identification information 2132 is stored in advance, and therefore, it is assumed that a plurality of the secret keys 2151 and a plurality of the public key certificates 2152 in the number corresponding to the number of a plurality of pieces of the identification information 2132 are stored. The identification information management processing unit 216 detects that the identification information 2132 is changed by the processing of the vehicle information transmission control processing unit 212 and changes the information that needs to be changed in accordance with the change of the identification information 2132. The identification information management processing unit 216 in Example 2 checks whether the identification information 2132 is changed periodically or by notification from the vehicle information transmission control processing unit 212 and in the case where the change is confirmed, the secret key 2151 and the public key certificate 2152 corresponding to the changed identification information 2132 are selected and the selected secret key and public key certificate are used afterward.

Figure 15:
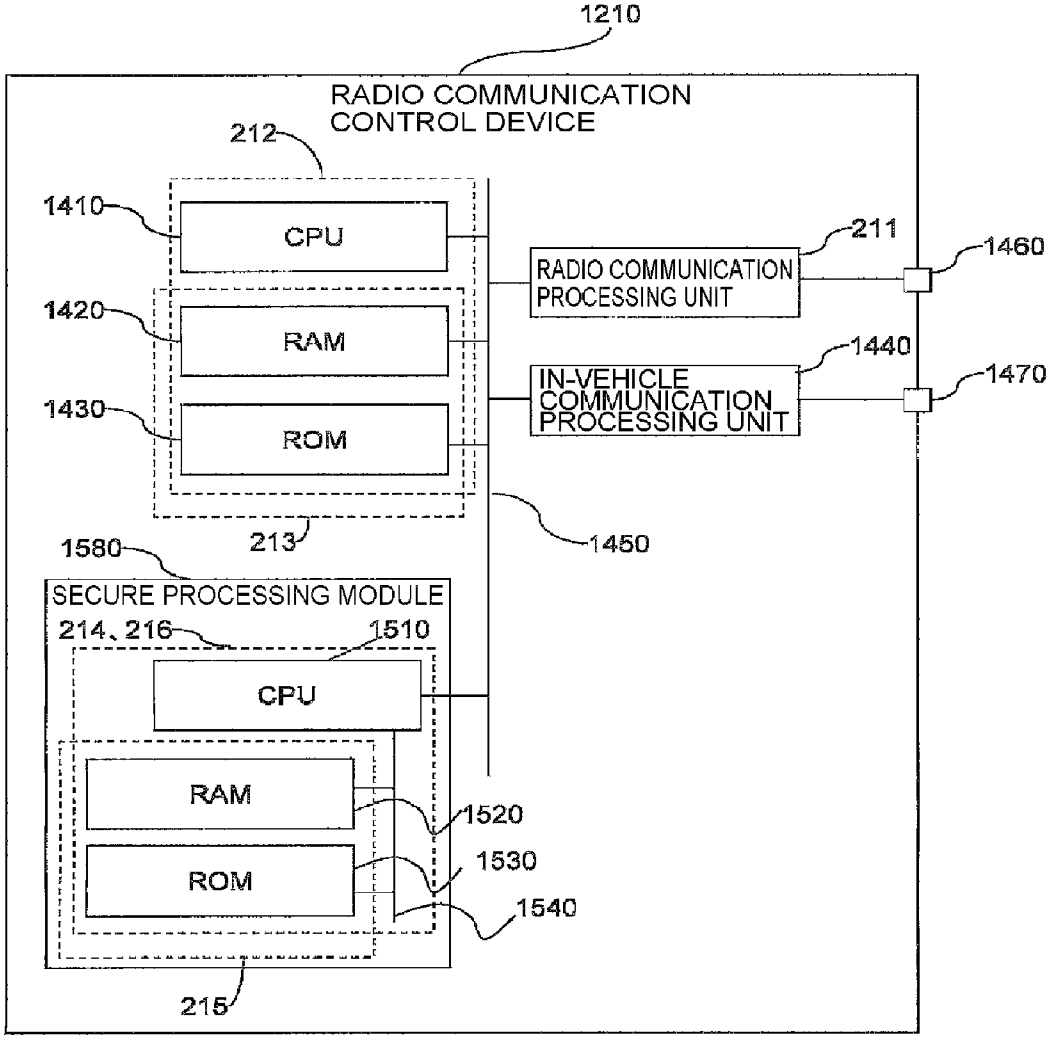
FIG. 15 is an outline hardware configuration diagram of a radio communication control device of Example 2.

FIG. 15 is an outline hardware configuration diagram of the radio communication control device 1210. The outline hardware configuration of the radio communication control device 1210 is explained using FIG. 15. Portions different from those of the radio communication control device 210 shown in FIG. 14 are explained. The radio communication control device 1210 in Example 2 includes a secure processing module 1580 in addition to the configuration of the radio communication control device 210 in Example 1. The secure processing module 1580 is an information processing module having a so-called tamperproof function to make unauthorized reference, alteration, etc., of the data recorded within the module difficult to perform from outside, and includes a CPU, ROM, RAM, or dedicated hardware device. The signature generation/verification processing unit 214, the security information storage unit 215, and the identification information management processing unit 216 in Example 2 are located within the secure processing module 1580. The hardware configuration of the secure processing module 1580 includes a CPU 1510 configured to perform some kind of operation and control processing in accordance with programs, a RAM 1520 used as a work area of the CPU 1510 and configured to keep various kinds of operation and control data, a ROM 1530 configured to keep programs used in the CPU 1510, and a bus 1540 configured to couple the CPU 1510, the RAM 1520, and the ROM 1530 with one another and to exchange various kinds of command, address, and data mutually. The configuration is not necessarily limited to the configuration described above, and for realization of each function any realization measures may be taken. The RAM 1520 includes one of the static memory (SRAM) and the dynamic memory (DRAM) or both SRAM and DRAM. The ROM 1530 includes an electrically alterable nonvolatile memory, such as a flash memory, a magnetoresistive RAM (MRAM), a resistive memory (ReRAM), and a phase change memory.

The functions of the signature generation/verification processing unit 214 and the identification information management processing unit 216 are realized by the CPU 1510, the RAM 1520, and the ROM 1530 and the function of the security information storage unit 215 is realized by the RAM 1520 and the ROM 1530. It may also be possible to configure one semiconductor integrated circuit device by forming the CPU 1510, the RAM 1520, the ROM 1530, and the bus 1540 over one semiconductor substrate. It may also be possible to configure one semiconductor integrated circuit device by forming the CPU 1510, the RAM 1520, and the ROM 1530 over different semiconductor substrates, respectively, and by packaging the three semiconductor substrates into one semiconductor package. In this case, the bus 1540 is provided over the semiconductor substrate where any of the CPU 1510, the RAM 1520, and the ROM 1530 is formed. Further, it may also be possible to configure one semiconductor integrated circuit device by forming the CPU 1410, the RAM 1420, the ROM 1430, and the bus 1450 over one semiconductor substrate, forming the CPU 1510, the RAM 1520, the ROM 1530, and the bus 1540 over another semiconductor substrate, and packaging the two semiconductor substrates into one semiconductor package. In FIG. 15, the secure processing module 1580 is configured by the CPU 1510, the RAM 1520, the ROM 1530, and the bus 1540, but, it may also be possible to configure the secure processing module 1580 by dedicated hardware devices. Further, in FIG. 15, the secure processing module 1580 exists independently of the CPU 1410, the RAM 1420, and the ROM 1430, but, for example, it may also be possible to realize the functions of the signature generation/verification processing unit 214 and the identification information management processing unit 216 by the CPU 1410, the RAM 1420, and the ROM 1430 and to realize the function of the security information storage unit 215 by the RAM 1420 and the ROM 1430 without including the CPU 1510, the RAM 1520, the ROM 1530, and the bus 1540.

Figure 13:
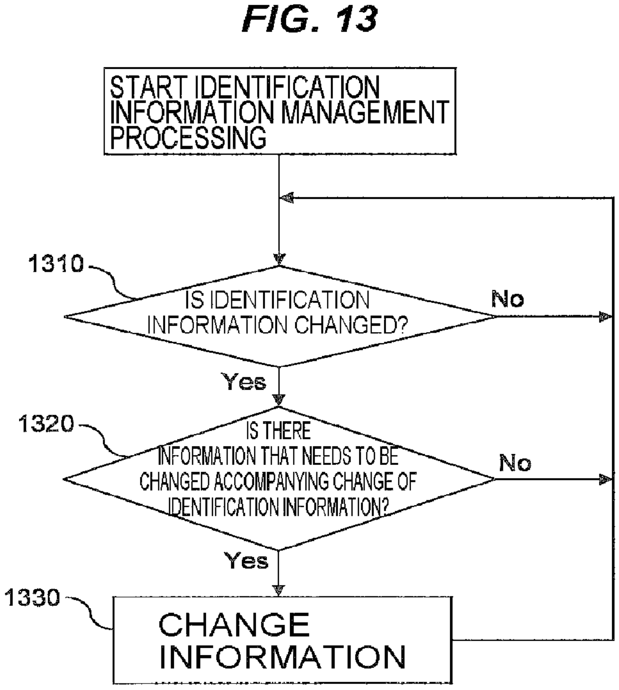
FIG. 13 is a diagram showing a processing flow of an identification information management processing unit of Example 2.

In Example 2, the information that needs to be changed accompanying the change of the identification information 2132 is the secret key and the public key certificate, but, there may exist another piece of information. The processing flow of the identification information management processing unit 216 at that time is shown in FIG. 13. At step 1310, the change of the identification information 2132 is checked. In the case where the change is confirmed (in the case of Yes), the procedure proceeds to step 1320 and whether or not there exists information that needs to be changed is checked. In the case where the change cannot be confirmed (in the case of No), after a predetermined time elapses, the procedure returns to step 1310 and the change of the identification information 2132 is checked again. In the case where it is confirmed that there exists information that needs to be changed (in the case of Yes) at step 1320, all the information that needs to be changed is changed at step 1330 and the procedure returns to step 1310. In the case where it cannot be confirmed that there exists information that needs to be changed (in the case of No) at step 1320, the procedure returns to step 1310 and the change of the identification information 2132 is checked again.

In Example 2, a plurality of pieces of identification information 2132 is stored in advance, and therefore, it is necessary to store a plurality of secret keys 2151 and a plurality of public key certificates 2152 in the number corresponding to the number of a plurality of pieces of identification information 2132. However, as in Example 1, in Example 2 also, it is only necessary to retain only the information of the vehicles that exist around, and it is not necessary to retain the information of all the vehicles, and therefore, it is possible to reduce the amount of memory used. The secure processing module configured to perform encryption processing and decoding processing is provided separately from the vehicle information transmission control processing unit 212, and therefore the processing load can be dispersed.

In Example 2, the transmission control to prevent the mobile device information misuse is the same as that in Example 1 or in Modification 2, and therefore, as in Example 1 and Modification 1, it is possible to realize the prevention of mobile device information misuse by a method that does not require a large amount of memory for the mobile terminal, that has a small processing load, or that gives small adverse influence on the service.

As above, the invention made by the present inventors is explained specifically based on the embodiments and the examples, but, it is needless to say that the present invention is not limited to those and various kinds of modifications may be made.

What is claimed is:

1. A method of updating vehicle identification, comprising:

periodically transmitting, by a mobile terminal in a vehicle, said identification information which is included in the first vehicle information, the first vehicle information comprising first identification information for identifying the vehicle; and first status information indicating a status of the vehicle, determining, by the mobile terminal, whether or not there is a possibility of collision or rear-end collision with another vehicle from second vehicle information received from said another vehicle and the first status information;

determining, by the mobile terminal, whether or not there is a possibility that the vehicle is tracked by said another vehicle;

determining, by the mobile terminal, in a case where there is a possibility of being tracked, whether or not it is effective to perform an update of the first identification information of the first vehicle information;

determining, by the mobile terminal, in a case of performing the update of the first identification information, whether an adverse influence on a safe driving support service being provided is large or small, depending on whether or not there is a possibility of collision or rear-end collision of the vehicle with another vehicle; and performing, by the mobile terminal, the update of the first identification information in a case where there is a possibility of being tracked, and in which the mobile terminal determines that performing the update of the first identification information will be effective, and in which the mobile terminal determines that the adverse influence on the service is small.

2. The method according to claim 1, wherein the mobile terminal determines that the adverse influence on the safe driving support service is large in a case where traffic information is being acquired from the another vehicle even in a case where there is no possibility of collision or rear-end collision with another vehicle.

3. The method according to claim 1, wherein in a case where the vehicle has moved for a predetermined time or more, or a predetermined distance or more, if the another vehicle exists around the vehicle or if there is notification from a user, the mobile terminal determines that the vehicle is tracked by the another vehicle.

4. The method according to claim 1, wherein in a case where the vehicle has changed a traveling direction and there is a possibility that the another vehicle exists around the vehicle, or in a case where a color of a traffic signal, through which the vehicle has passed, has changed, the mobile terminal determines that it will be effective to perform the update of the first identification information.

5. The method according to claim 1, wherein the mobile terminal updates the first identification information and information that needs to be updated accompanying the update of the first identification information.

* * * * *